(12) United States Patent
Yuan et al.

(10) Patent No.: US 7,298,428 B1
(45) Date of Patent: Nov. 20, 2007

(54) LIQUID CRYSTAL DEVICE AND METHOD FOR OPTICAL PERFORMANCE MONITORING IN FIBER OPTIC COMMUNICATION SYSTEMS

(75) Inventors: Haijun Yuan, Fremont, CA (US); Yongsheng Liu, San Jose, CA (US); Xingzhong Zhao, Newark, CA (US)

(73) Assignee: Avanex Corporation, Fremont, CA (US)

( * ) Notice: Subject to any disclaimer, the term of this patent is extended or adjusted under 35 U.S.C. 154(b) by 302 days.

(21) Appl. No.: 10/637,115

(22) Filed: Aug. 8, 2003

Related U.S. Application Data (60) Provisional application No. 60/439,380, filed on Jan. 10, 2003.

(51) Int. Cl.
*G02F 1/1335* (2006.01)
(52) U.S. Cl. ........................................ 349/18
(58) Field of Classification Search ............... 349/194, 349/196–198, 201–202, 17; 385/11
See application file for complete search history.

(56) References Cited

U.S. PATENT DOCUMENTS

| | | | |
|---|---|---|---|
| 5,666,174 A * | 9/1997 | Cupolo, III ................ 349/64 |
| 6,208,774 B1 * | 3/2001 | Sorin et al. ................ 385/11 |
| 6,522,467 B1 * | 2/2003 | Li et al. ..................... 359/484 |
| 6,680,797 B2 * | 1/2004 | Juday ........................ 359/484 |
| 2002/0122444 A1 * | 9/2002 | Tsai ........................... 372/18 |
| 2003/0035605 A1 * | 2/2003 | Bouevitch et al. ......... 385/1 |
| 2003/0103718 A1 * | 6/2003 | Chen ......................... 385/22 |
| 2003/0194165 A1 * | 10/2003 | Silberberg et al. ......... 385/11 |

\* cited by examiner

*Primary Examiner*—David Nelms
*Assistant Examiner*—Phu Vu
(74) *Attorney, Agent, or Firm*—Patterson & Sheridan, LLP (57) ABSTRACT

A liquid crystal optical performance monitor is described that employs a liquid crystal tunable filter for receiving a P-polarization beam and a rotated S-polarization beam from a C-polarizer. The rotated S-polarization beam from a birefringent crystal in C-polarizer propagates through a waveplate which rotates the polarization by 90 degrees, resulting in the rotated S-polarization beam having the same polarization orientation as the P-polarization beam. The liquid crystal tunable filter therefore receives just the P-polarization orientation. The C-polarizer and a small beam collimator are rotated so that the polarization orientation of the P-polarization beam and the rotated S-polarization beam matches the orientation of the LC inside the LC cavity of the LC tunable filter. In a first embodiment, the liquid crystal optical performance monitor is implemented with a photodiode. In a second embodiment, the liquid crystal optical performance monitor is implemented with a bi-cell photo diode.

13 Claims, 8 Drawing Sheets

LIQUID CRYSTAL DEVICE AND METHOD FOR OPTICAL PERFORMANCE MONITORING IN FIBER OPTIC COMMUNICATION SYSTEMS

CROSS REFERENCE TO RELATED APPLICATIONS

This application claims benefit of U.S. provisional patent application Ser. No. 60/439,380, entitled "Method and Apparatus for a Fiber Optic Housing and Aligning Device" by Giovanni Barbarossa et al., filed on Jan. 10, 2003, which is incorporated herein by reference.

BACKGROUND INFORMATION

1. Field of the Invention

The invention relates generally to the field of optics, and more particularly to optical communication networks.

2. Description of Related Art

An optical performance monitor (OPM) is a key element in current proliferative and complex optical communication networks. An optical performance monitor provides information such as the wavelength power, wavelength drift and optical signal-to-noise ratio (OSNR) to each node in an optical communication network.

Currently, there are two basic optical performance monitor architectures, a parallel system and a series system. A parallel design typically uses a dispersing element, such as a grating, for separating spectral signals of light while detecting spectral information with a photodiode array. A series system employs a tunable filter and a single detector coupled to the tunable filter. One drawback in the parallel approach is that it requires an expensive detector array, and typically the dimension of this component is quite bulky. Although the series approach can be compact and flexible, this approach necessitates the use of a high performance tunable filter.

Typical designs of tunable filters are based on thermal, piezo-mechanical or electro-optic effects. One feature of a conventional tunable filter is the parallelism in the Fabry-Perot cavity, which affects the passband of the tunable filter, and consequently defines the performance of an optical performance monitor using such filter. The processing techniques for making such a tunable filter are based on micro-electromechanical systems (MEMS) technology, which can be complicated as well as requiring expensive semiconductor manufacturing facilities. Therefore, an optical performance monitor which uses a tunable filter based upon MEMS technology is an expensive solution.

Accordingly, it is desirable to have a tunable filter based optical performance monitor that is more compact than a parallel system but yet is cost effective for deployment in optical performance monitor applications.

SUMMARY OF THE INVENTION

The invention describes a liquid crystal (LC) optical performance monitor that employs a liquid crystal tunable filter for receiving a P-polarization beam and a S-polarization beam from a C-polarizer. The S-polarization beam propagates through a waveplate which rotates the S-polarization beam by 90 degrees, resulting in the S-polarization beam having the same polarization as the P-polarization beams. The liquid crystal tunable filter therefore affects just the P-polarization beam. The C-polarizer and a small beam collimator are rotated so that the polarization orientation of the P-polarization beam and the S-polarization beam matches the orientation of a polarization direction of the liquid crystal material inside the liquid crystal cavity of the liquid crystal tunable filter. In a first embodiment, the liquid crystal optical performance monitor is implemented with a photodiode. In a second embodiment, the liquid crystal optical performance monitor is implemented with a bi-cell photodiode.

The selection of a small beam collimator is designed so as to create a minimal space separation between the P-polarization beam and the S-polarization beam while maintaining a maximum extinction ratio of the polarization. Combining the features of a small beam collimator with small beam waists located on the center of the cavity, the present invention significantly reduces the parallelism requirement for a liquid crystal cavity. Moreover, the present invention advantageously simplifies the manufacturing process as well as providing a cost-effective OPM apparatus.

Other structures and methods are disclosed in the detailed description below. This summary does not purport to define the invention. The invention is defined by the claims.

DETAILED DESCRIPTION OF PREFERRED EMBODIMENTS

Figure 1:
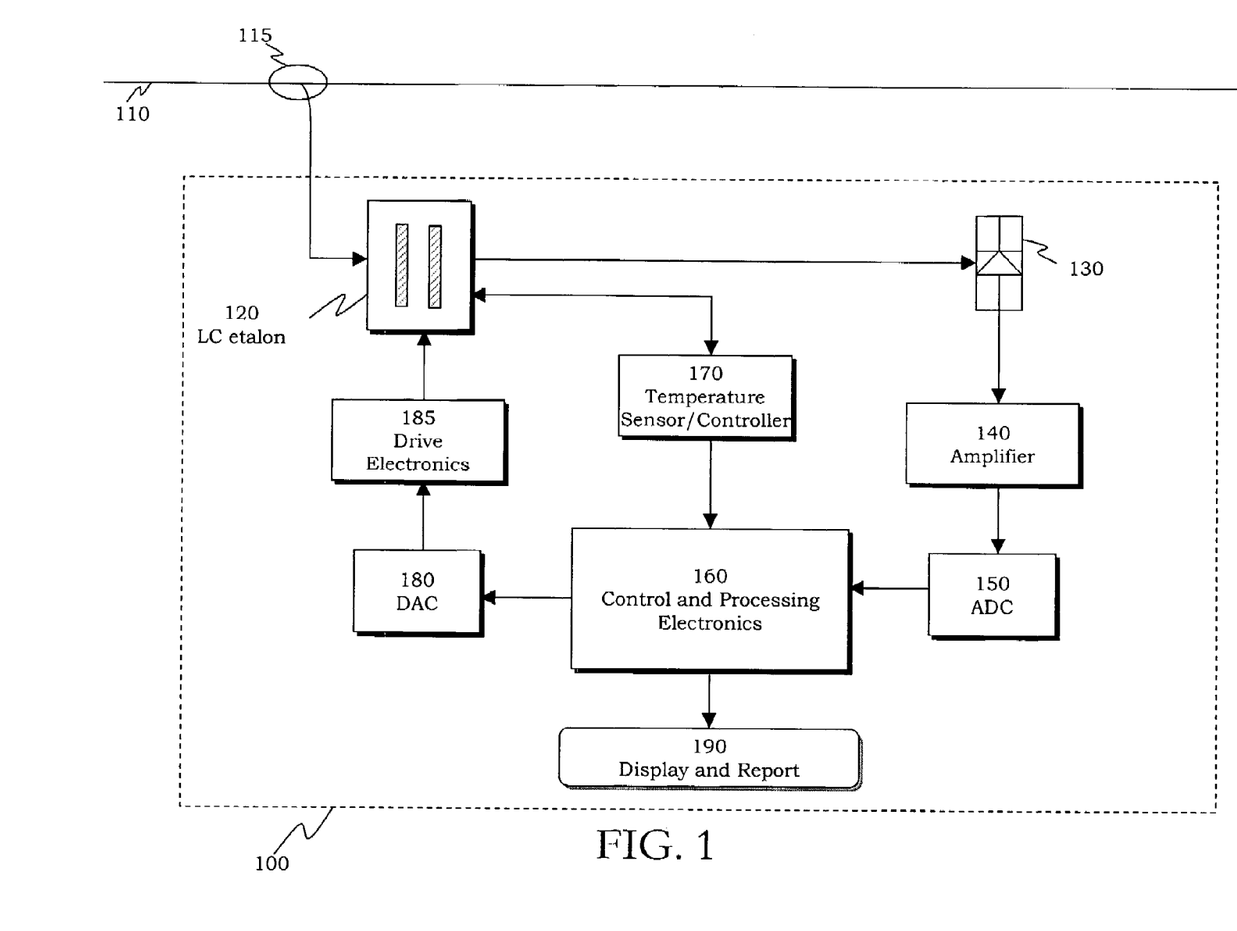
FIG. 1 is a system diagram illustrating a liquid crystal tunable-filter-based optical performance monitor in a dense wavelength division multiplexing (DWDM) system in accordance with the present invention.

Referring now to FIG. 1, there is shown a system diagram that illustrates a liquid crystal tunable-filter-based optical performance monitor 100 in a dense wavelength division multiplexing system. The optical performance monitor 100 typically taps a small portion of light from a main express fiber optic 110 from a coupler 115 and processes the small portion of light to obtain the spectral information of the signal carried by the main fiber optic 110. The optical performance monitor 100 comprises a liquid crystal etalon 120, a PIN diode 130, an amplifier 140, an analog-to-digital converter (ADC) 150, control and processing electronics 160, a temperature sensor/controller 170, a digital-to-analog converter (DAC) 180, drive electronics 185, and a display and reporting interface 190.

A voltage is applied to the liquid crystal etalon 120 to detect the spectral information signal of a light from the main fiber optic 110. The signal is processed through the PIN diode 130 and amplified by the amplifier 140. The ADC 150 converts the analog format of the light signal to a digital format. The control and processing electronics 160 synchronize the scanning and processing data, and obtains the spectral information of the signal sampled from main express fiber optic 110, such as the power level, the channel wavelength drift, as well as the optical signal-to-noise ratio (OSNR). A temperature sensor and controller 170 is coupled to the liquid crystal etalon 120 and the control and processing electronics 160. The DAC 180 converts the digital signal from the control and processing electronics 160 to an analog signal. The drive electronics 195 provides a driving circuit to the liquid crystal etalon 120. The result from the optical performance monitor 100 is reported and displayed by interface 190.

Figure 2:
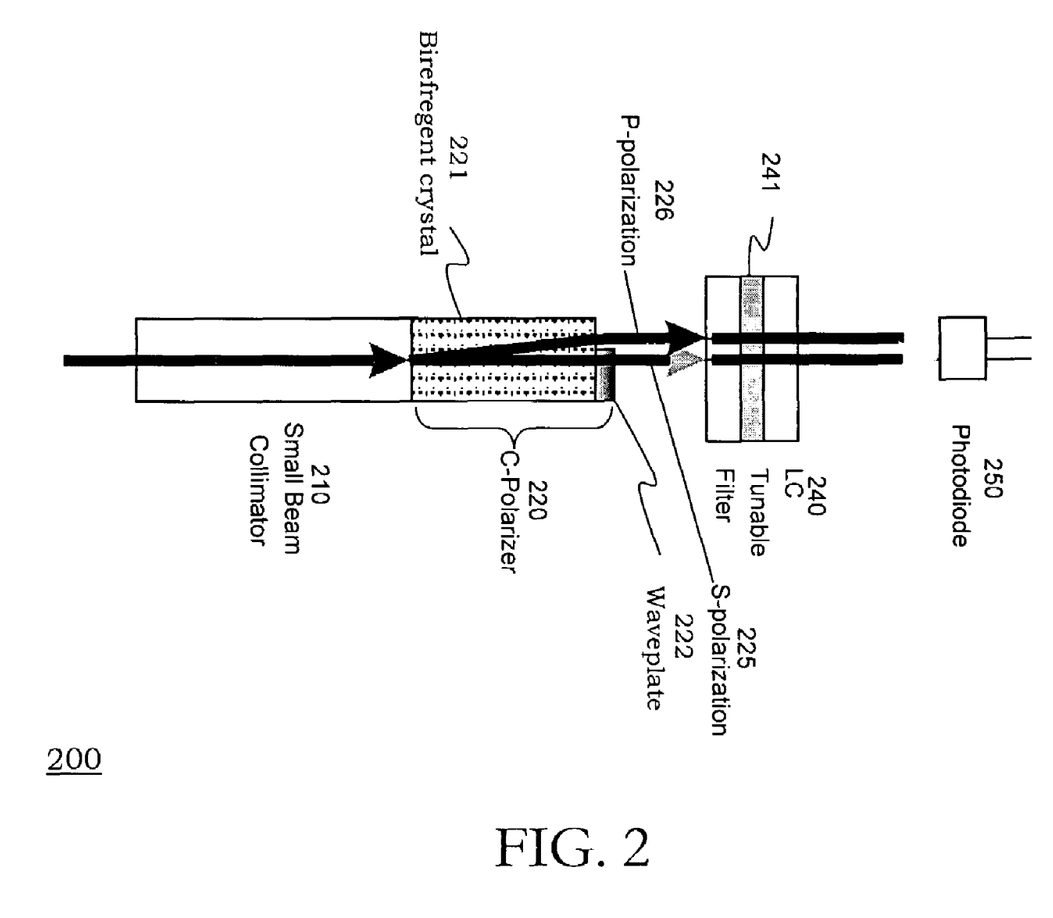
FIG. 2 is a schematic diagram illustrating a first embodiment of the optical path using a liquid crystal tunable filter with a photodiode in a liquid crystal optical performance monitor in accordance with the present invention.

FIG. 2 is a schematic diagram illustrating the optical path using a liquid crystal tunable filter with a photodiode in the first embodiment of a liquid crystal optical performance monitor 200 in accordance with the present invention. The liquid crystal optical performance monitor 200 comprises a beam collimator 210 (preferably small, i.e. small beam collimator), a C-polarizer 220, a LC tunable filter 240, and a photodiode 250. The C-polarizer 220 comprises a birefringent crystal 221 (preferably comprising $YVO_4$) and a waveplate 222 (preferably a half waveplate). The birefringent crystal 221 separates a collimated beam into a first linearly polarized beam and a second polarized beam that is polarized orthogonally to the first beam, for instance a S-polarization beam 225 and a P-polarization beam 226. The waveplate 222 rotates the polarization orientation of one of the linearly polarized beams, for instance, the S-polarization beam 225 by 90 degrees so that the S-polarization beam 225 has the same polarization as the P-polarization beam 226. After the polarization orientation of the S-polarization beam 225 has been rotated 90 degrees by the waveplate 222, the rotated S-polarization beam 225 has the same polarization as the P-polarization beam 226. Effectively, the rotated S-polarization 225 has become a P-polarization beam. To describe it from another perspective, as the liquid crystal tunable filter 240 affects the P-polarized optical beams (i.e., the P-polarized beam 226 and the rotated S-polarized beam 225), the input beam has to be converted to a polarized beam by using the C-polarizer 220. After the C-polarizer, the polarization orientation for both the beams 225 and 226 has to match a polarization orientation of the liquid crystal material inside the liquid crystal cavity in the liquid crystal tunable filter 240.

The small beam collimator 210 is designed to yield minimal space separation between the S-polarization beam 225 and P-polarization beam 226, while still maintaining a maximum extinction ratio of the polarization. The beam waists are located on the center of the cavity. As discussed above, the parallelism of the walls of the liquid crystal tunable cavity is a significant requirement for the performance of an optical performance monitor. The small beam waists on the cavity and the minimal separation between the two separated beams 225 and 226 significantly reduce the parallelism requirement for the cavity. Therefore, the liquid crystal optical performance monitor can be manufactured easily and is cost effective.

One of ordinary skill in the art should recognize that the term liquid crystal tunable filter can refer to as a liquid crystal cell, a liquid crystal etalon, or to other similar terminologies.

Figure 3:
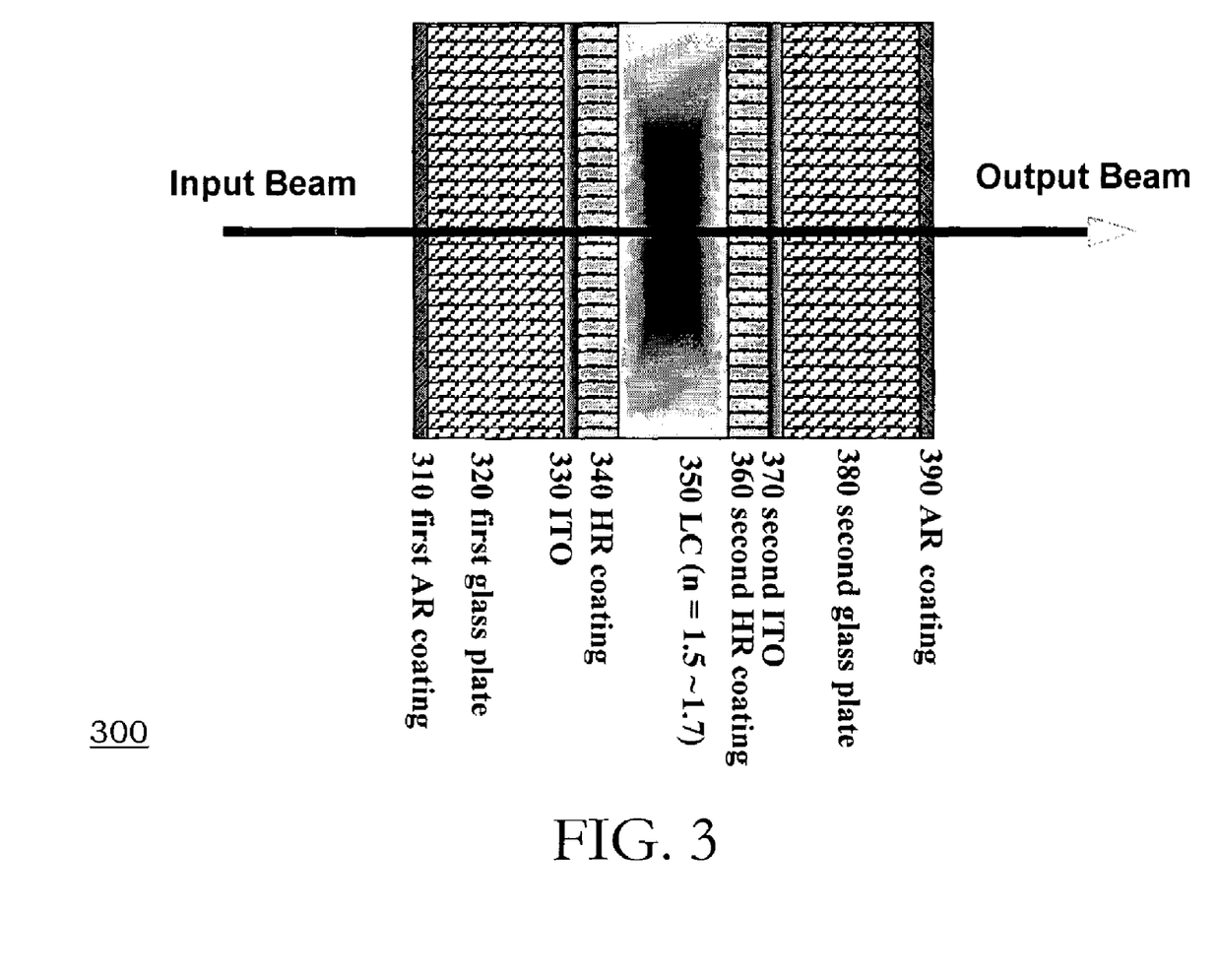
FIG. 3 is a pictorial diagram illustrating a liquid crystal cavity in accordance with the present invention.

FIG. 3 is a pictorial diagram illustrating a liquid crystal cavity 300. The liquid crystal cavity 300 comprises a first anti-reflective (AR) coating layer 310, a first glass plate 320, a first ITO electrode layer 330, a first high reflective (HR) coating layer 340, a liquid crystal 350, a second HR coating layer 360, a second ITO layer 370, a second glass plate 380, and a second AR coating layer 390.

In addition, a first alignment layer is added between the first HR coating layer 340 and the liquid crystal 350. A second alignment layer is added between the liquid crystal 350 and the second HR coating layer 360. The first and second alignment layers are also referred to as buffer layers.

Figure 4:
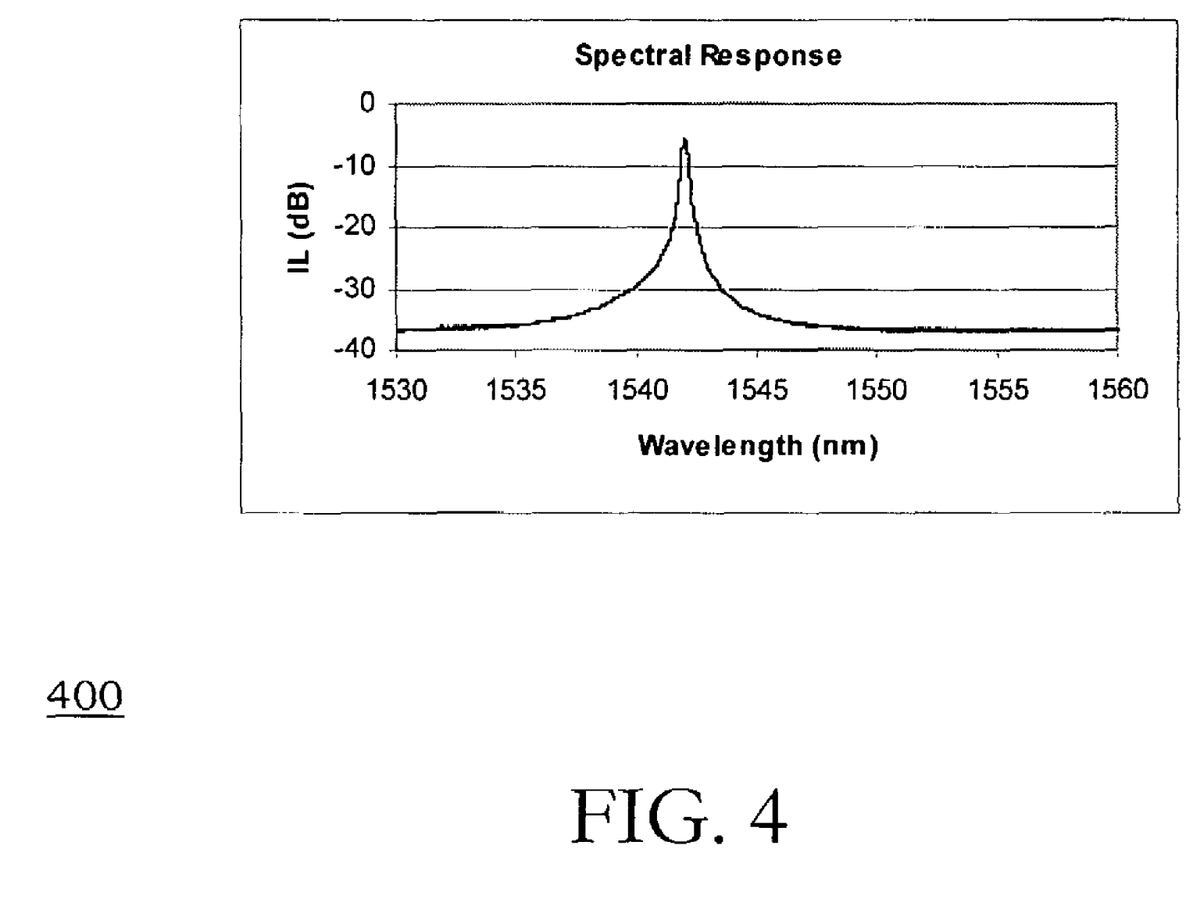
FIG. 4 is a graphical diagram illustrating a sample spectral response of a liquid crystal Fabry-Perot cavity in accordance with the present invention.

Table 1 shown below is an example of design parameters of a liquid crystal Fabry-Perot cavity and small beam collimator. A sample spectral response of a liquid crystal etalon is shown in FIG. 4.

TABLE 1

| LC Filter Parameters | | | | |
|---|---|---|---|---|
| Cavity Spacing (um) | FSR (nm) | Reflectivity (%) | Finesse | FWHM (nm) |
| 8~12 | 45~60 | 99.5 | >350 | <0.025 |

| Collimator Parameters | | | | |
|---|---|---|---|---|
| Beam Size (um) | Working Distance (mm) | Beam Separation (mm) | Extinction Ratio (dB) | Pointing Error (°) |
| 100~125 | 15~20 | ~0.25 | >30 dB | <0.10 |

Figure 5:
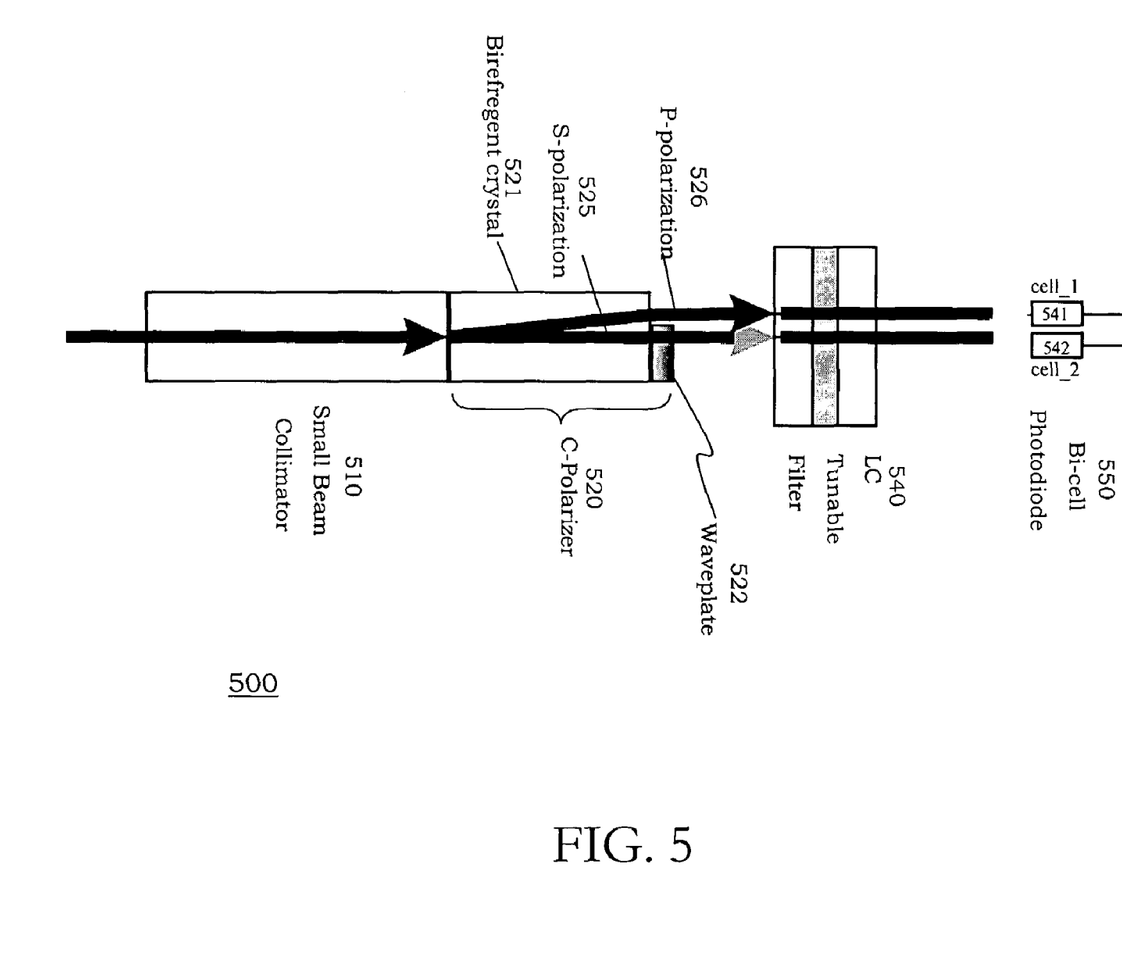
FIG. 5 is a schematic diagram illustrating a second embodiment of a liquid crystal optical performance monitor comprising a bi-cell photodiode configuration in accordance with the present invention.

FIG. 5 is a schematic diagram illustrating a second embodiment of a liquid crystal optical performance monitor 500. The optical performance monitor 500 is designed with a bi-cell photodiode configuration. The bi-cell photodiode configuration 500 comprises a small beam collimator 510, a C-polarizer 520, a liquid crystal tunable filter 550, and a bi-cell photodiode 550. The bi-cell photodiode 540 employs a cell_1 541 for receiving a P-polarization beam 526 and a cell_2 542 for receiving a rotated S-polarization beam 525. The two beams, the rotated S-polarization beam 525 and the P-polarization beam 526, are received by the two-separated cells 541 and 542 in the photodiode 540. As result of the arrangement, the parallelism requirement for the liquid crystal tunable filter is further reduced while the whole device remains compact.

Alternatively, the two beams, the rotated S-polarization beam 525 and the P-polarization beam 526, can be separated further by using two individual photodiodes (instead of a bi-cell photodiode) to perform the same function as described above. The tradeoff is that the overall package will be larger.

Figure 6A:
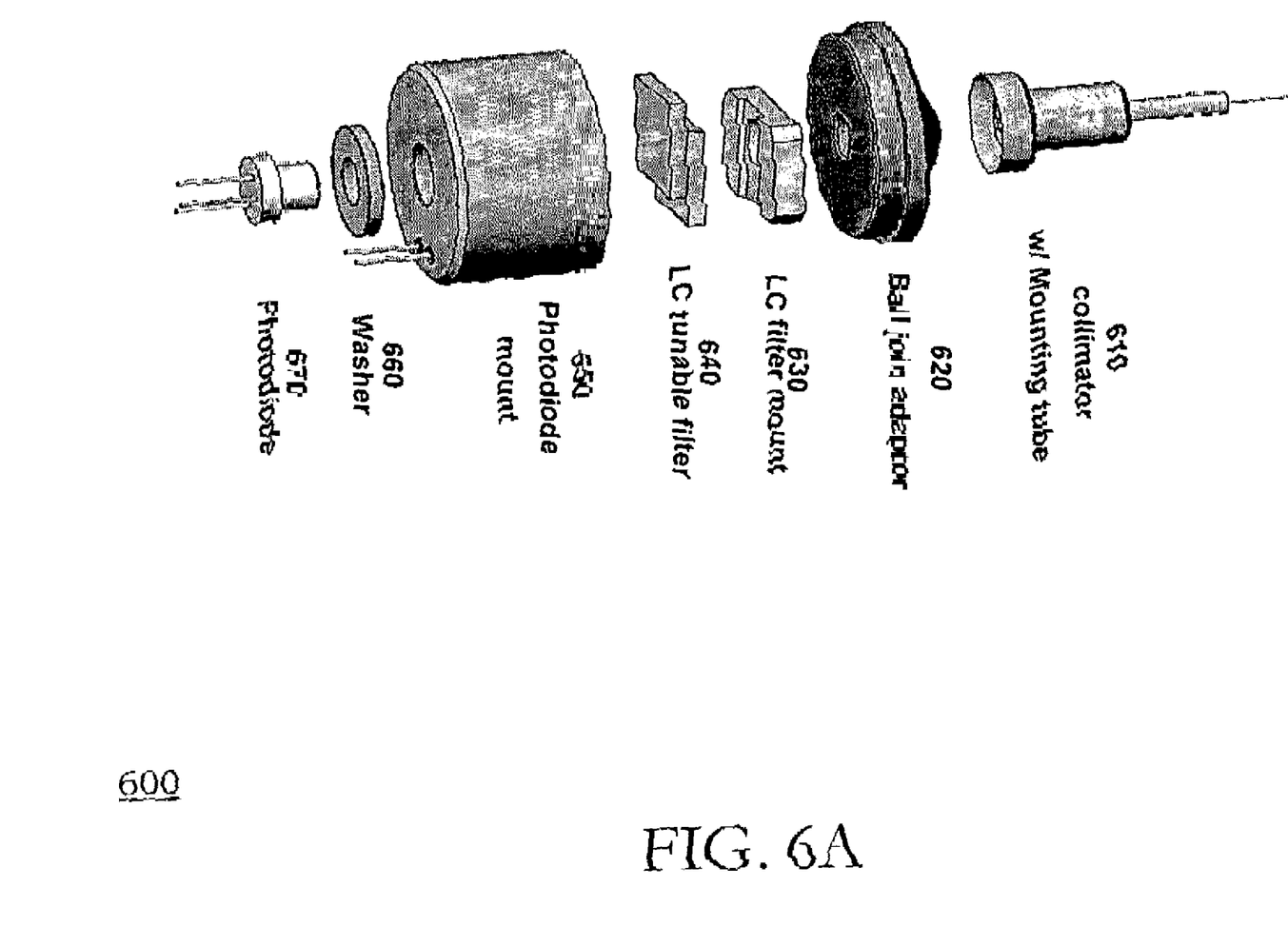
FIG. 6A is a pictorial exploded diagram illustrating a mechanical package of the optical path of a liquid crystal optical performance monitor in accordance with the present invention.
Figure 6B:
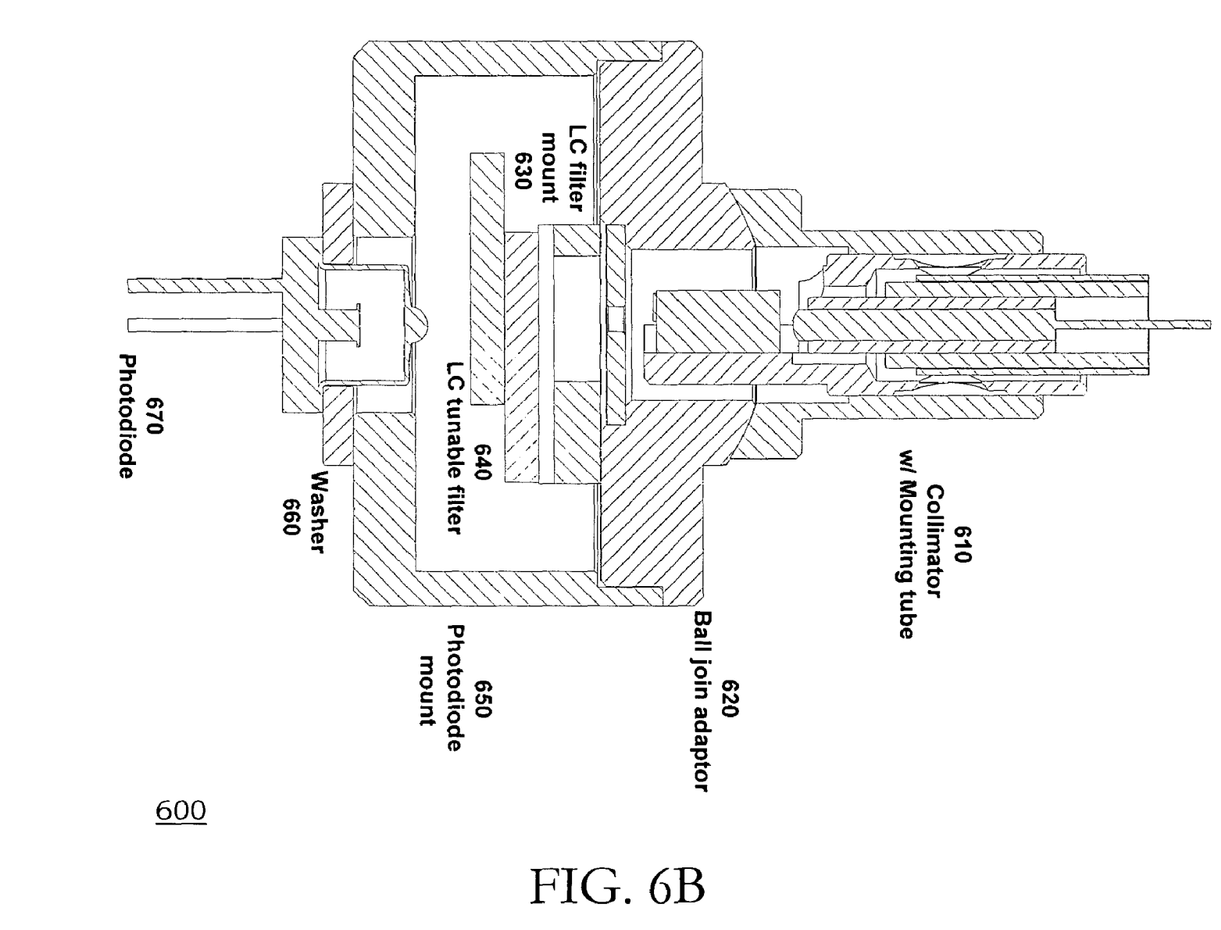
FIG. 6B is a pictorial cross-sectional diagram illustrating the mechanical package of the optical path of the liquid crystal optical performance monitor in accordance with the present invention.

FIG. 6A is a pictorial exploded diagram, with the cross-sectional view shown in FIG. 6B, illustrating a mechanical package 600 of a liquid crystal optical performance monitor in accordance with the present invention. The mechanical package 600 comprises a collimator with a mounting tube 610, a ball join adaptor collimator 620, a liquid crystal filter mount 630, a liquid crystal tunable filter 640, a photodiode mount 650, a washer 660, and a photodiode 670. A join structure (the collimator with mounting tube 610, the ball join adaptor 620 and the liquid crystal filter mount 630)

between the collimator with mounting tube 610, the ball join adaptor 620 and the liquid crystal tunable filter 640 is used to maintain the tip/tilt alignment capability. The purpose of the join structure is to ensure that the beam waists of the both beams (the rotated S-polarization beam 525 and the P-polarization beam 526) are within the center of the cavity of the liquid crystal tunable filter 640. On the photodiode component, the photodiode 670 is inserted through the washer 660 and into the photodiode mount 650.

The LC tunable filter 640 is mounted on the LC filter mount 630 which has a same or similar thermal expansion coefficient as the material used for the LC tunable filter 640. The LC filter mount 630 serves as a buffer layer for minimizing the stress and strain caused to the LC tunable filter 640 during an assembly process. The LC tunable filter 640 and the LC filter mount 630 are then attached to the ball join adaptor 620. The collimator 210 and the C-polarizer 220 are mounted in the mounting tube 610, which has a concave ball join structure at one of its ends. The ball join structure between the join adaptor 620 and the collimator tube 610 allows for tight contact between the two parts, while still maintaining the angular adjustment capability. The collimator 210 and the C-polarizer 220 can be adjusted along an axis of the mount tube 610, thereby allowing the beam waist on the center of LC cavity. The photodiode 670 is pre-mounted on a washer 660, and actively aligned on the photodiode mount 650 until the maximum photo signal is received.

Currently, the dimension of the liquid crystal filter 640 is a limitation on the size of the apparatus. Potentially, if the size of the liquid crystal filter 640 is reduced sufficiently, the whole package should be able to accommodate inside an industry-standard TO-type can.

Figure 7:
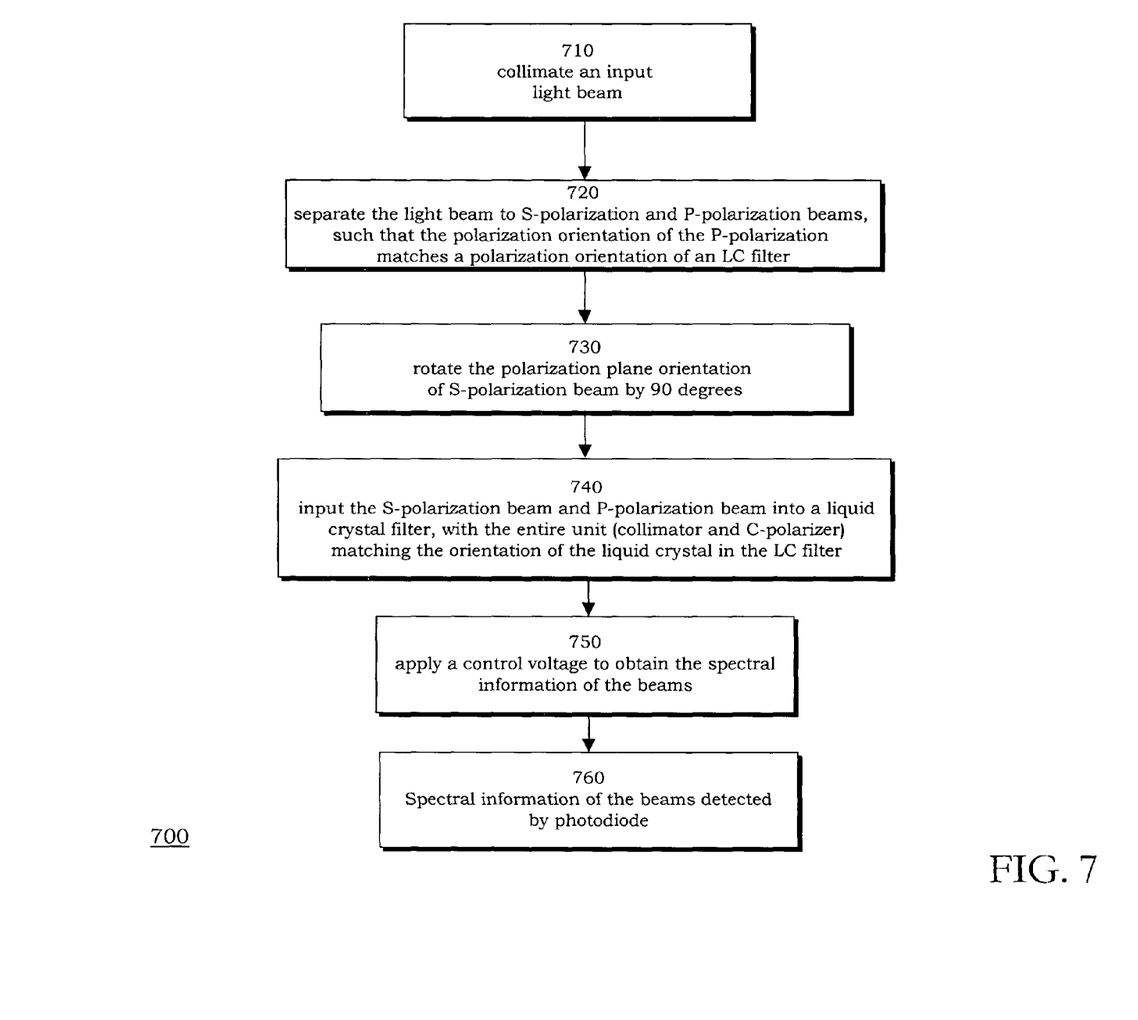
FIG. 7 is a flow diagram illustrating the process of the signal processing steps in the liquid crystal tunable-filter-based optical performance monitor in accordance with the present invention.

FIG. 7 is a flow diagram illustrating the process 700 of the signal processing steps in the liquid crystal tunable-filter-based optical performance monitor in accordance with the present invention. At step 710, the small beam collimator 210 collimates an incoming light beam to become a collimated beam. At step 720, the C-polarizer 220 first separates the collimated beam into the S-polarization beam 225 and the P-polarization beam 226, and then (at step 730), rotates the polarization orientation of the S-polarization beam by 90 degrees. The polarization orientation of the P-polarization beam in this step matches a polarization orientation of a liquid crystal tunable filter. After the rotation, the two beams 225 and 226 have the same polarization orientation. At step 740, the P-polarization beam and the rotated S-polarization beams 226, 225 are input into a liquid crystal filter that has a polarization orientation that matches that of the beams output from the C-polarizer 220. At step 750, a controlled scanning voltage is applied to the mid-section 241 of the liquid crystal tunable filter, resulting in the change of the refractive index of the liquid crystal, thus affecting the change of the spectral property (pass band) of the LC filter. At step 760, the scanned spectral signal of the optical beams 225 and 226 is detected by the photodiode 250.

The above embodiments are only illustrative of the principles of this invention and are not intended to limit the invention to the particular embodiments described. Accordingly, various modifications, adaptations, and combinations of various features of the described embodiments can be practiced without departing from the scope of the invention as set forth in the appended claims.

We claim:

1. A liquid crystal (LC) optical performance monitor (OPM), comprising:
   a C-polarizer having a birefringent crystal having a first face and a second face for receiving a collimated beam and separating the collimated beam into a P-polarization beam and a S-polarization beam;
   a waveplate coupled to the second face of the crystal for rotating the S-polarization beam by 90 degrees, thereby causing the rotated S-polarization beam to have the same polarization as the P-polarization beam; and
   a liquid crystal tunable filter for receiving and processing the P-polarization beam and the rotated S-polarization beam from the C-polarizer, wherein the P-polarization beam and the rotated S-polarization beam are separate from one another, and beam waists of the P-polarization beam and the rotated S-polarization beam are located substantially on a center of a liquid crystal cavity in the liquid crystal tunable filter.

2. The LC OPM of claim 1, further comprising a beam collimator coupled to the first face of the C-polarizer, the beam collimator providing a minimal space separation between the P-polarization beam and the rotated S-polarization beam.

3. The LC OPM of claim 2, wherein C-polarizer and the beam collimator are rotated to match a polarization orientation of the LC material inside a LC cavity of the LC tunable filter.

4. The LC OPM of claim 3, further comprising a photodiode for receiving the P-polarization beam and rotated S-polarization beam.

5. The LC OPM of claim 1, further comprising a bi-cell photodiode having a first cell and a second cell, the first cell of the bi-cell photodiode receiving the P-polarization beam, the second cell of the bi-cell photodiode receiving the rotated S-polarization beam.

6. A method of a LC OPM, comprising:
   separating a collimated beam into a P-polarization beam and a S-polarization beam;
   rotating the S-polarization beam by 90 degrees, thereby the S-polarization beam having the same polarization as the P-polarization beam; and
   scanning to filter the spectral information of the S-polarization beam and the P-polarization beam by a liquid crystal tunable filter, wherein the P-polarization beam and the S-polarization beam are separate from one another, and beam waists of the P-polarization beam and the S-polarization beam are located substantially on a center of a liquid crystal cavity in the liquid crystal tunable filter.

7. The method of claim 6, further comprising collimating an input beam to generate the collimated beam.

8. The method of claim 7, further comprising matching the alignment of the LC filter in the direction of the liquid crystal.

9. The method of claim 8, further comprising applying a voltage to an LC tunable filter to affect the rotated S-polarization beam and the P-polarization beam.

10. A method of a LC OPM, comprising:
    separating a collimated beam into a first beam comprising a first linear polarization and a second beam comprising a second linear polarization that is orthogonal to the first linear polarization;
    rotating the polarization of one of the first beam or the second beam by 90 degrees, thereby causing the first and second beams to have the same polarization; and
    scanning to filter the spectral information of the first beam and the second beam by a liquid crystal tunable filter, wherein the first beam and the second beam are separate from one another, and beam waists of the first beam and the second beam are located substantially on a center of a liquid crystal cavity in the liquid crystal tunable filter.

11. The method of claim 10, further comprising collimating an input beam to generate the collimated beam.

12. The method of claim 11, further comprising matching the alignment of the LC filter in the direction of the liquid crystal.

13. The method of claim 12, further comprising applying a voltage to an LC tunable filter to affect the rotated first beam and the second beam.

* * * * *